United States Patent
Norcott et al.

(10) Patent No.: US 6,205,451 B1
(45) Date of Patent: Mar. 20, 2001

(54) METHOD AND APPARATUS FOR INCREMENTAL REFRESH OF SUMMARY TABLES IN A DATABASE SYSTEM

(75) Inventors: William D. Norcott, Noshua, NH (US); James Finnerty, Lexington, MA (US)

(73) Assignee: Oracle Corporation, Redwood Shores, CA (US)

(*) Notice: Subject to any disclaimer, the term of this patent is extended or adjusted under 35 U.S.C. 154(b) by 0 days.

(21) Appl. No.: 09/083,643

(22) Filed: May 22, 1998

(51) Int. Cl.$^7$ ........................................ G06F 17/30
(52) U.S. Cl. .................... 707/204; 707/203; 707/101; 707/200; 707/205
(58) Field of Search .................. 395/161; 707/1, 707/2, 3, 10, 103, 204, 7, 101, 200, 203, 205

(56) References Cited

U.S. PATENT DOCUMENTS

| | | | |
|---|---|---|---|
| 5,444,842 | * 8/1995 | Bentson et al. | 395/161 |
| 5,848,405 | * 12/1998 | Norcott | 707/1 |
| 5,873,093 | * 2/1999 | Williamson et al. | 707/103 |
| 5,960,426 | * 9/1999 | Pirahesh et al. | 707/3 |
| 5,974,416 | * 10/1999 | Anand et al. | 707/10 |
| 6,006,216 | * 12/1999 | Griffin et al. | 707/2 |
| 6,023,695 | * 2/2000 | Osborn et al. | 707/3 |
| 6,088,705 | * 7/2000 | Lightstone et al. | 707/200 |

* cited by examiner

Primary Examiner—Wayne Amsbury
Assistant Examiner—Thuy Pardo
(74) Attorney, Agent, or Firm—Hickman Palermo Truong & Becker, LLP; Brian D. Hickman

(57) ABSTRACT

A method and apparatus are provided for performing deferred incremental refresh of summary tables that are derived from two or more base tables. Incremental refresh is performed by assigning a hypothetical load sequence to the base tables of the summary table. For each base table that contains new data that affects the summary table, a join is performed between (1) the new data in the base table, (2) the pre-update state of base tables that follow the base table in the hypothetical load sequence, and (3) the post-update state of base tables the precede the base table in the hypothetical load sequence. The results of the join are then merged with the existing summary table to refresh the summary table. According to one aspect of the invention, efficiency is improved by performing the joins for the various base tables in parallel.

18 Claims, 6 Drawing Sheets

(t1) TIME TABLE 102

| time_id | day | hour | month |
|---|---|---|---|
| 1 | 1 | 01 | JAN 1980 |
| 2 | 1 | 23 | JAN 1980 |
| 3 | 5 | 02 | JAN 1980 |
| 4 | 5 | 08 | JAN 1980 |
| 5 | 6 | 06 | FEB 1980 |
| ⋮ | ⋮ | ⋮ | ⋮ |
| 50 | 3 | 13 | JUL 1985 |

(t2) LOCATION TABLE 104

| loc_id | street | city | state |
|---|---|---|---|
| 1 | 1st | Santa Clara | CA |
| 2 | Main | Los Angeles | CA |
| 3 | Peachtree | Atlanta | GA |
| 4 | Main | Atlanta | GA |
| 5 | Howard | Santa Clara | CA |
| ⋮ | ⋮ | ⋮ | ⋮ |
| 12 | Kifer | Ogden | UT |

(t3) PRODUCT_SALES 106

| sale_id | loc_id | time_id | total |
|---|---|---|---|
| 1 | 1 | 4 | $500 |
| 2 | 11 | 3 | $300 |
| 3 | 10 | 1 | $20 |
| 4 | 3 | 3 | $10 |
| 5 | 9 | 70 | $400 |
| ⋮ | ⋮ | ⋮ | ⋮ |
| 5,000 | 5 | 20 | $60 |

*Fig. 1*

SALESREPORT TABLE 202

| month | city | sumsales |
|---|---|---|
| JAN 1980 | Santa Clara | $50,000 |
| JAN 1980 | Los Angeles | $90,000 |
| JAN 1980 | Atlanta | $30,000 |
| JAN 1980 | Tustin | $15,000 |
| JAN 1980 | Seattle | $70,000 |
| ⋮ | ⋮ | ⋮ |
| JUL 1985 | Ogden | $35,000 |

Fig. 2

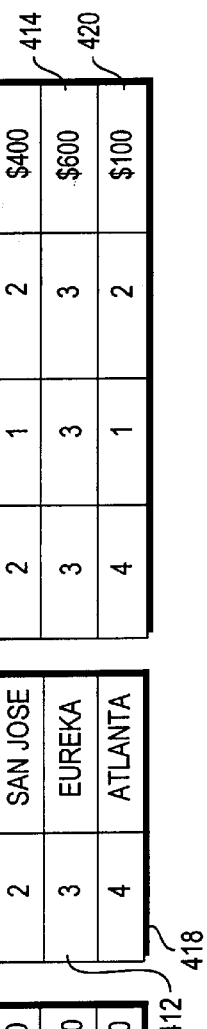

SALESREPORT TABLE 502a

| month | city | sumsales |
|---|---|---|
| JAN 1980 | IRVINE | $300 |
| FEB 1980 | IRVINE | $400 |

| month | city | sumsales |
|---|---|---|
| FEB 1980 | IRVINE | $100 |

— 510

| month | city | sumsales |
|---|---|---|
| MAR 1980 | EUREKA | $600 |

SALESREPORT TABLE 502C

| month | city | sumsales |
|---|---|---|
| JAN 1980 | IRVINE | $300 |
| FEB 1980 | IRVINE | $500 |
| MAR 1980 | EUREKA | $600 |

METHOD AND APPARATUS FOR INCREMENTAL REFRESH OF SUMMARY TABLES IN A DATABASE SYSTEM

RELATED APPLICATIONS

This application is related to U.S. application Ser. No. 08/839,190, filed Apr. 21, 1997 by William D. Norcott, entitled "Method and Apparatus for Identifying New Data by Address Ranges", now U.S. Pat. No. 5,848,405 the contents of which are incorporated herein by this reference.

FIELD OF THE INVENTION

This invention relates to databases and, more specifically, to methods and apparatus for updating data in data summary tables.

BACKGROUND OF THE INVENTION

Computer database systems that are used for data warehousing frequently store pre-computed summary information in summary tables in order to speed up query processing. The data from which the summary tables are generated are referred to as base data. The tables that contain the base data are referred to as base tables.

Summary tables typically store aggregated information, such as "sum of PRODUCT_SALES, by region, by month." Other examples of aggregated information include counts of tally totals, minimum values, maximum values, and average calculations. As new data is periodically added to the base tables, the summary information needs to be updated (i.e., refreshed) to reflect the new base data.

One approach to refreshing summary tables is referred to as the "total refresh" or "full refresh" approach. According to the total refresh approach, the values in summary tables are recalculated based on all of the base data every time new base data is supplied. Systems that employ full refresh approach have the disadvantage that the recreation process is a relatively lengthy operation due to the size and number of tables from which the summary information is derived. For example, when ten new rows are added to a particular base table that contains a million rows, a total refresh operation would have to process all one million and ten rows of the base table to regenerate the summary tables derived using the base table.

The process of updating summary information may be improved by performing incremental refresh, where rather than generating a new set of summary information based on calculations that use all of the base data, the summary information is updated based on previous summary values and the new base data.

One difficulty associated with performing incremental refresh is that a single summary table may contain summarized data derived from multiple base tables. For example, assume that a database includes the three base tables illustrated in FIG. 1. Referring to FIG. 1, a PRODUCT_SALES table 106 contains information about specific sales made by a company. A LOCATION table 104 contains information about where the sales took place. A TIME table 102 contains information about the times at which sales were made.

FIG. 2 illustrates a SALESREPORT table 202 that stores the pre-computed result of an aggregate query based on the PRODUCT_SALES table 106, LOCATION table 104 and TIME table 102. In the specific example given, SALESREPORT table 202 stores the sum of all sales made in each city during each month.

Information that defines a summary table is referred to herein as a "summary definition". A summary definition indicates (1) the location of the base data that is used to derive the summary table, and (2) how the base data from the base tables should be aggregated to derive the summarized data. In many systems, summary definitions take the form of queries. For example, the query for the SALESREPORT table 202 may be expressed in a relational database system using the following SQL language statement which joins the three base tables:

```
SELECT time.month, location.city, SUM (product_sales.total)
sumsales
    FROM time t1, location t2, PRODUCT_SALES t3
    WHERE time.time_id=product_sales.time_id AND
location.loc_id=product_sales.loc_id
    GROUP BY month, city
```

The "SELECT" line indicates that columns that are to be used to generate the summary table. The "FROM" line indicates the tables that have those columns. The "WHERE" line indicates the criteria for joining values from one table with corresponding values from the other tables. For example, values in row 108 of TIME table 102, row 110 of LOCATION table 104, and row 112 of PRODUCT_SALES table 106 would be joined together because the time_id value in row 108 matches the time_id value in row 112, and the loc_id value in row 110 matches the loc_id value in row 112.

The "GROUP BY" line indicates that the rows retrieved by the select statement should be put into groups for each month/city combination. The "sum" function in the "SELECT" line indicates that for each of those groups, the values from the "total" columns are to be summed. The resulting summary table will thus have one row for every month/city combination, and that row will have a column called "sumsales" that contains the sum of the "total" column values for that month/city combination.

The SALESREPORT table 202 illustrated in FIG. 2 is an example of the summary table that would be generated in response to the summary table definition specified above. The SALESREPORT table 202 has the three rows specified in the SELECT line of the summary table definition: month, city, and sumsales.

If the system that maintains the SALESREPORT table 202 does not support incremental refresh, the query listed above must be run against the base tables each time data is added to any of the base tables. Rather than re-compute the entire contents of SALESREPORT when new data is added to the system, it would be more efficient to re-compute just the changes to the existing SALESREPORT that result from the new data that was added to the base tables.

Prior mechanisms for incremental refresh have relied upon the re-computing of aggregates as data is being loaded into base tables. Thus, as one set of rows is added to a base table, the summary table is updated based on the data in the new rows. As a second set of rows is added to a base table, the summary table is again updated based on the data in the second set of rows. This is not a practical nor efficient solution for two reasons: first, the database user may have business reasons to not re-compute the summary each and every time data is loaded into base tables; and second, combining aggregation with data loading degrades the performance of the data-loading procedure.

Based on the foregoing, it is clearly desirable to provide a practical and efficient mechanism for incremental refresh of summaries that allows refresh to be deferred until after base data has been loaded into the data warehouse. It is further desirable that the mechanism correctly and efficiently refresh the summary regardless how many times new data has been added to the base table since the last time the summary table was refreshed.

In addition, it is desirable to provide an incremental refresh mechanism produces the correct results even when multiple base table updates have been loaded since the last refresh operation. It is further desirable that the mechanism perform correctly if a particular base table has had new data loaded into it multiple times since the last refresh of the summary table. The mechanism for incremental refresh should also perform multiple operations in parallel in order to perform the incremental refresh more quickly.

SUMMARY OF THE INVENTION

A method and apparatus are provided for performing deferred incremental refresh of summary tables that are derived from two or more base tables. Incremental refresh is performed by assigning a hypothetical load sequence to the base tables of the summary table. For each base table that contains new data that affects the summary table, a join is performed between (1) the new data in the base table, (2) the pre-update state of base tables that follow the base table in the hypothetical load sequence, and (3) the post-update state of base tables the precede the base table in the hypothetical load sequence. The results of the join are then merged with the existing summary table to refresh the summary table. According to one aspect of the invention, efficiency is improved by performing the joins for the various base tables in parallel.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1 is a block diagram that illustrates base tables that may be used to derive a summary table;

FIG. 2 is a block diagram that illustrates a summary table that may be derived from the base tables shown in FIG. 1;

FIG. 4a is a block diagram of a set of base tables prior to one or more loads;

FIG. 4b is a block diagram of data inserted into base tables during one or more loads;

FIG. 4c is a block diagram of the base tables shown in FIG. 4a after one or more loads have inserted the data shown in FIG. 4b;

FIG. 5a is a block diagram of a summary table derived from the tables shown in FIG. 4a;

FIG. 5b is a block diagram of rows produced during generation of individual delta summaries;

FIG. 5c is a block diagram of the summary table of FIG. 5a after the rows of FIG. 5b have been merged into it.

DETAILED DESCRIPTION OF THE PREFERRED EMBODIMENT

A method and system are described for performing incremental refresh on summary tables that have a plurality of base tables. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 3:
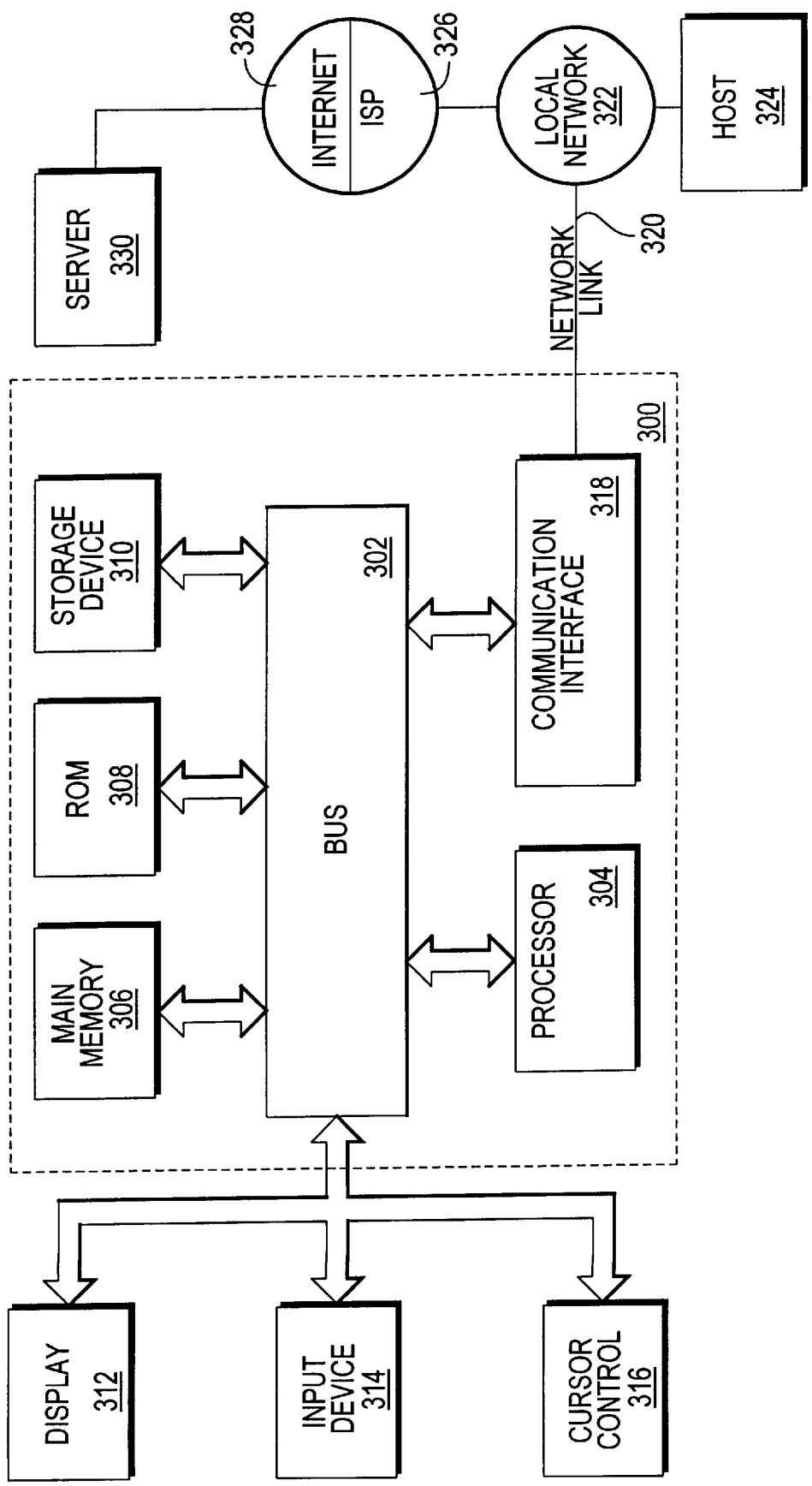
FIG. 3 is a block diagram illustrating a computer system on which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for performing incremental refresh of summary tables that have more than one base table. According to one embodiment of the invention, incremental refresh is performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector coupled to appropriate circuitry can receive the data carried in the infra-red signal and place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

FUNCTIONAL OVERVIEW

According to an embodiment of the invention, a mechanism is provided for performing deferred incremental refresh of summary tables that have more than one base table. For the purpose of explanation, embodiments of the invention shall be described in the context of a relational database system in which the summary data and the base data are stored in relational tables. However, the present invention is not limited to any particular type of database system, nor any particular form of data containers for the base or summary data.

According to the techniques described herein, a new relation, referred to herein as the "delta summary", is computed. The delta summary is derived from the query that defines the summary table. However, unlike a total refresh operation, the delta summary is computed using queries that are limited by the "delta rows" that were added to base tables, instead of the entire contents of the base tables. Consequently, the computation of the delta summary involves significantly less overhead than a total refresh operation. The delta summary is then merged with the existing summary table to refresh the summary table.

PHASES OF INCREMENTAL REFRESH

There are various phases to the incremental refresh techniques described herein. During the initial phase, the base tables that have had new rows added since the last time the summary table was refreshed are identified. Then, for each such base table, the following three operations are performed:

1. The new "delta rows"=0 that have been added to base tables are identified.
2. The delta summary is computed.
3. The contents of the delta summary are merged into the summary table.

IDENTIFYING THE DELTA ROWS

Since a delta summary is based upon the changes that have occurred to a table, it is necessary to identify those changes after they have already occurred, i.e. to be able to identify new rows that have been added to a table since the most recent refresh operation.

Various techniques may be used to identify the rows that are added to the base tables of a summary table after the most recent refresh operation. One technique is described in the U.S. patent application Ser. No. 08/839,190, filed Apr. 21, 1997, entitled: "METHOD AND APPARATUS FOR IDENTIFYING NEW DATA BY ADDRESS RANGES", the contents of which are incorporated herein by this reference.

Alternate techniques may also be used to track delta rows. For example, each row may in the summary tables may have a corresponding flag that is set when the row is added, and cleared when an update is performed based on the row. Using another technique, each new row is added to a "delta table" associated with a base table at the same time it is added to the base table. When an incremental refresh is performed, the delta table used to perform the refresh is dropped and a new delta table is created for storing subsequently added rows.

The techniques described herein are not limited to any particular mechanism for identifying delta rows. Any mechanism that allows separate identification of the pre-update state, the post-update state, and the delta-rows, for each of the base tables may be used.

INDIVIDUAL DELTA SUMMARIES

Computing a delta summary involves N variables (where N is the number of base tables). According to one aspect of the invention, the complexity of computing a delta summary is reduced by dividing the incremental refresh operation into N simpler operations each having a single variable. The N simpler operations involve the generation of individual delta summaries.

Individual delta summaries collectively constitute the delta summary. Prior to computing the individual delta summaries, it must be determined which individual delta summaries are required in order to refresh the summary table and how to compute each individual delta summary. According to the techniques described herein, each individual delta summary is computed independently from and in parallel with the other individual delta summaries that collectively constitute the delta summary, thus improving system performance.

DETERMINING WHICH DELTA SUMMARIES TO CREATE

A delta summary describes the changes to an existing summary table that result from new rows being added to a base table. For each base table occurring in the FROM list of the definition of a summary table, a separate individual delta summary is computed. For example, assume that the summary table that needs to be refreshed is the SALESREPORT table 202 illustrated in FIG. 2. The definition for that summary table is:

---

SELECT time.month, location.city, SUM (product_sales.total) sumsales
FROM time t1, location t2, PRODUCT_SALES t3
WHERE time.time_id=product_sales.time id AND location.loc_id=product_sales.loc_id
GROUP BY month, city

---

The FROM list in this summary definition refers to three tables: TIME table 102 (t1), LOCATION table 104 (t2), and PRODUCT_SALES table 106 (t3). Consequently, The "create_individual_delta_summary" procedure will be called three times:

create_individual_delta_summary (SALESREPORT, TIME)

create_individual_delta_summary (SALESREPORT, LOCATION)

create_individual_delta_summary (SALESREPORT, PRODUCT_SALES)

HYPOTHETICAL LOADS

Prior to describing the operations performed by the create_individual_delta_summary procedure, it is necessary to understand the notion of a hypothetical load. Hypothetical loads result when (1) a sequence is assigned to the base tables and (2) an assumption is made that all of the data loads into the base tables occurred in this sequence.

For example, the assumption may be that all data loads were made to the TIME table 102 before any were made to the LOCATION table 104, and that all data loads were made to the LOCATION table 104 before any were made to the PRODUCT_SALES table 106. Based on this assumption, a "hypothetical load" of all of the changes to the TIME table 102 was made at time T1, a second "hypothetical load" of all of the changes to the LOCATION table 104 was made at time T2, and a third "hypothetical load" of all of the changes to the PRODUCT_SALES table 106 was made at time T3.

Significantly, each base table may have been loaded several times since the last refresh, and the actual loads may have been sequenced in a way that bears no resemblance to the sequence selected for computing the delta summary. Thus, a completely arbitrary sequence may be assigned to the hypothetical loads without affecting the accuracy of the results.

For the purpose of describing the current invention by way of example, the following arbitrary sequence shall be assigned to the hypothetical loads of the base tables:

---

| T1 | hypothetical load of TIME table 102 |
| T2 | hypothetical load of LOCATION table 104 |
| T3 | hypothetical load of PRODUCT_SALES table 106 |

---

HYPOTHETICAL TABLE STATES

For the purpose of explanation, the prefix "pre_" shall be used to identify a table as it existed at the time of the most recent refresh. The prefix "delta_" shall be used to identify the set of rows that were added to a table after the most recent refresh. The prefix "post_" shall be used to refer to the table after the delta rows have been added to the table. For example, using this notation:

---

| pre_TIME | refers to the contents of the TIME table 102 before new rows were added to the TIME table 102; |
| delta_TIME | refers to the new data rows that were added to the TIME table 102 during the hypothetical load of TIME table 102; and |
| post_TIME | refers to the entire contents of the TIME table 102 after new rows have been added. |

---

Once a sequence has been assigned to the hypothetical loads, the states of the base tables may be considered at different points in time. Starting with time T0, before any loads have occurred, and ending at time T3, after all base tables have been loaded, the various table states are:

---

| | TIME | LOCATION | PRODUCT_SALES |
|---|---|---|---|
| T(0): | pre_TIME | pre_LOCATION | pre_PRODUCT_SALES |
| T(1): | post_TIME | pre_LOCATION | pre_PRODUCT_SALES |
| T(2): | post_TIME | post_LOCATION | pre_PRODUCT_SALES |
| T(3): | post_TIME | post_LOCATION | post_PRODUCT_SALES |

---

Because these states are based on the timing of hypothetical loads, the intermediary states themselves are hypothetical, and do not necessarily reflect states that ever actually existed. For example, there may never have been an actual time T2 at which all of the TIME and LOCATION changes had been loaded, but at which none of the PRODUCT_SALES changes had been loaded.

The point in time that a hypothetical load is completed is referred to herein as a hypothetical load time. Thus, T1, T2 and T3 represent hypothetical load times. According to one embodiment, an individual delta summary is computed for each hypothetical load time. The base table whose hypothetical load was completed at the hypothetical load time is considered to be the "current" or "interesting" table. Thus, at time T1 the interesting table is the TIME table 102. At time T2 the interesting table is the LOCATION table 104, and at time T3 the interesting table is the PRODUCT_SALES table 106.

SUMMARY DEFINITION QUERY TRANSFORMATION

As mentioned above, an individual delta summary is computed for each hypothetical load time. The individual delta summary for a hypothetical load time is computed by executing a transformed version of the summary definition query of the summary table. According to one embodiment, the transformed query for a hypothetical load time is identical to the summary definition query, except for the row sources specified in the FROM section of the query.

For example, each individual delta summary for the SALESREPORT table 202 has the form:

```
SELECT time.month, location.city, SUM (product_sales.total)
  sumsales
  FROM {row sources}
  WHERE time.time_id=product_sales.time_id AND
location.loc_id=product_sales.loc_id
    GROUP BY month, city
```

In this example, {row sources} represents the portion of the query that will vary based on the hypothetical load time for which the individual delta summary is being computed.

The rules for determining the row sources to specify in an individual delta summary query are as follows:

(1) for the interesting table, the row source is the delta rows for the table;

(2) for tables hypothetically loaded before the interesting table, the row source is the post-update state of the tables;

(3) for tables hypothetically loaded after the interesting table, the row source is the pre-update state of the tables.

For example, for logical time T(1), create_individual_delta_summary (SALESREPORT, TIME) produces:

---
DELTA_SUM_DEF 1
---
SELECT time.month, location.city, SUM (product_sales.total) sumsales
FROM delta_TIME t1, pre_LOCATION t2, pre_PRODUCT_SALES t3
WHERE time.time_id=product_sales.time_id
AND location.loc_id=product_sales.loc_id
GROUP BY month, city For logical time T(2), create_individual_delta_summary (SALESREPORT, LOCATION) produces:

---
DELTA_SUM_DEF 2
---
SELECT time.month, location.city, SUM (product_sales.total) sumsales
FROM post_TIME t1, delta_LOCATION t2,
pre_PRODUCT_SALES t3
WHERE time.time_id=product_sales.time_id
AND location.loc_id=product_sales.loc_id
GROUP BY month, city For logical time T(3), create_individual_delta_summary (SALESREPORT, PRODUCT_SALES) produces:

---
DELTA_SUM_DEF 3
---
SELECT time.month, location.city, SUM (product_sales.total) sumsales
FROM post_TIME t1, post_LOCATION t2,
delta_PRODUCT_SALES t3
WHERE time.time_id=product_sales.time_id
AND location.loc_id=product_sales.loc_id
GROUP BY month, city Execution of each of these queries produces an individual delta summary. The three individual delta summaries thus produced are merged with the existing content of the SALESREPORT table 202 to incrementally refresh the SALESREPORT table 202.

It should be noted that, in general, the computational time and resources required to execute the statements that create the various individual delta summaries will be significantly less than the time and resources required to execute the summary table definition to perform a full refresh operation. Specifically, each delta summary involves a join operation between the delta rows of one base table and the pre or post update states of the other base tables. The number of delta rows of any base table will typically be very small relative to the size of the base table (often 100s or 1000s times smaller). Consequently, the processing required by the delta summary joins, and the quantity of data returned by the delta summary joins, are very small relative the a join required for a full summary table refresh.

METHOD OF GENERATING DELTA SUMMARY

Figure 6:
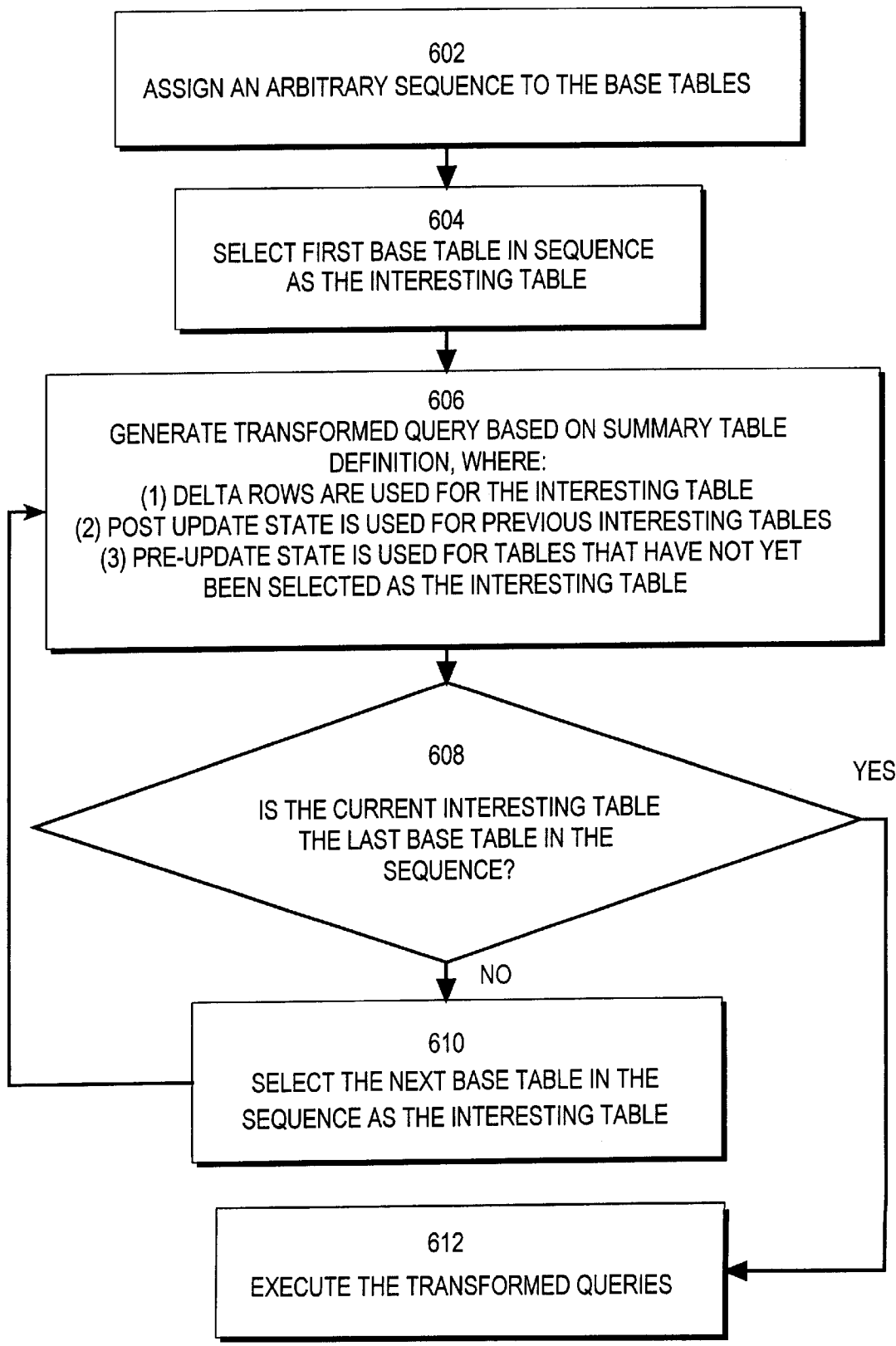
FIG. 6 is a flow chart that illustrates the steps for incrementally refreshing a summary table that is derived from a plurality of base tables according to an embodiment of the invention.

Referring to FIG. 6, it is a flow chart illustrating the steps for computing the delta summary for a deferred, incremental refresh of a summary table according to an embodiment of the invention.

At step 602, an arbitrary logical sequence is assigned to the base tables. At step 604, the first table in the sequence is selected as the "interesting" table. At step 606, a transformed query is generated based on the summary table definition. The transformed query references data associated with all of the base tables. However, the reference to any given based table is changed to reference (1) the delta rows for the interesting table, the pre-update state of the base tables that have not yet been selected as the interesting table, and (3) the post-update state of the base tables that have already been selected as the interesting table.

Steps 608 and 610 define a loop which causes step 606 to be performed for each base table. During each performance of step 606, a different query is generated. Consequently, after the last base table in the sequence has been processed as the interesting table, the number of queries equals the number of base tables, and control passes to step 612. At step 612, the queries generated in step 606 are executed, thus creating an individual delta summary for each query. These individual delta summaries collectively constitute that delta summary that is used to incrementally refresh the summary table.

MERGING THE DELTA SUMMARY

The third phase of deferred incremental refresh of summary tables involves merging the delta summary data into the summary table. Specifically, if a row in the delta summary does not correspond to an existing row in the summary table, then the row from the delta summary is inserted as a new row in the summary table. On the other hand, if there is a correspondence between rows in the delta summary and the summary table, then the aggregate columns of that row are updated, combining the values from the delta summary and the full summary according to an arithmetic expression.

The specific arithmetic expression will differ based on the aggregation function associated with the column. For example, the sumsales column of the SALESREPORT table 202 is associated with the "SUM" function. Consequently, a row from the delta summary is merged with a corresponding row in the summary table by replacing the existing sumsales value in the summary table row with the sum of (1) the sumsales value in the summary row table and (2) the sumsales value in the delta summary row.

Similar to SUM, for the COUNT aggregation function, delta summary values are merged with corresponding summary table rows by summing the new and existing count values. Averaging is handled by maintaining a SUM and a COUNT value, where the AVERAGE is derived by dividing the SUM by the COUNT. Variance and standard deviation are derived by maintaining a sum-squared column. The present invention is not limited to any particular merging techniques, nor any particular type of aggregate function.

EXAMPLE

The deferred incremental refresh techniques described herein shall now be described with reference to an example illustrated in FIGS. 4a, 4b, 4c, 5a, 5b and 5c.

FIG. 4a illustrates the state of tables 402a, 404a and 406a prior to a series of loads. Those tables shall be respectively referred to herein as pre_TIME 402a, pre _LOCATION 404a, and pre _PRODUCT_SALES 406a. FIG. 5a illustrates the state of a summary table 502a that has been refreshed based on tables 402a, 404a and 406a.

FIG. 4b illustrates the data that has been loaded into the TIME, LOCATION and PRODUCT_SALES tables subsequent to the most recent refresh of summary table 502a. In the example, two rows have been loaded into each of the tables. The newly loaded rows shall be respectively referred to as delta_TIME 402b, delta_LOCATION 404b, and delta_PRODUCT_SALES 406b.

FIG. 4c illustrates the state of the TINE, LOCATION and PRODUCT_SALES tables after the loads have been performed. Those tables shall be referred to herein as post_ TIME 402c, post_LOCATION 404c, and post_ PRODUCT_SALES 406c.

As mentioned above, the first step in generating the delta summary is to assume that all loads for each given table were made at the same time, and to assign a sequence to the hypothetical load operations. For the purpose of explanation, it shall be assumed that all loads were made to the PRODUCT_SALES table at time T1, all loads were made to the TIME table at time T2, and that all loads were made to the LOCATION table at time T3. As mentioned above, these hypothetical load times may bear no resemblance to the actual times the new data was loaded. For example, the new rows may have been loaded in the sequence: row 410, row 412, row 414, row 416, row 418 and row 420.

Once a sequence has been assigned to the hypothetical loads, a delta summary query is generated for each hypothetical load based on the summary table definition. Based on the hypothetical loads in the present example, the delta summary query for the hypothetical load of the PRODUCT_SALES table (time T1) will be:

| DELTA_SUM_DEF FOR PRODUCT_SALES |
| --- |
| SELECT time.month, location.city, SUM (product_sales.total) sumsales<br>FROM pre_TIME, pre_LOCATION, delta_PRODUCT_SALES<br>WHERE time.time_id=product_sales.time_id<br>AND location.loc_id=product_sales.loc_id<br>GROUP BY month, city |

Execution of this query produces the individual delta summary for the PRODUCT_SALES table. This query defines a join between pre_TIME 402a, pre_LOCATION 404 a, and delta_PRODUCT_SALES 406 b. This join produces a single row, shown as row 510 in FIG. 5b.

The delta summary query for the hypothetical load of the TIME table (time T2) will be:

| DELTA_SUM_DEF TIME |
| --- |
| SELECT time.month, location.city, SUM (product_sales.total) sumsales<br>FROM delta_TIME, pre_LOCATION, post_PRODUCT_SALES<br>WHERE time.time_id=product_sales.time id<br>AND location.loc_id=product_sales.loc_id<br>GROUP BY month, city |

Execution of this query produces the individual delta summary for the TIME table. This query defines a join between delta_TIME 402b, pre_LOCATION 404a, and post_PRODUCT_SALES 406c. This join produces no data at all because no location listed in pre_LOCATION 404a made any sales recorded in post_PRODUCT_SALES 406c during the periods listed in delta_TIME 402b.

For logical time T(3), create_individual_delta_ summary (SALESREPORT, PRODUCT_SALES) produces:

| DELTA_SUM_DEF LOCATION |
| --- |
| SELECT time.month, location.city, SUM (product_sales.total) sumsales<br>FROM post_TIME delta_LOCATION,<br>post_PRODUCT_SALES<br>WHERE time.time_id=product_sales.time_id<br>AND location.loc_id=product_sales.loc_id<br>GROUP BY month, city |

Execution of this query produces the individual delta summary for the LOCATION table. This query defines a join between post_TIME 402c, delta_LOCATION 404b, and post PRODUCT_SALES 406c. This join produces a single row, shown as row 512 in FIG. 5b.

After the individual delta summaries have been generated for each of the base tables of SALESREPORT table 502a, they are merged with SALESREPORT table 502 a to produce SALESREPORT table 502c, illustrated in FIG. 5c. Specifically, for each row in each individual delta summary (each "result row"), the SALESREPORT table is searched based on the values in the dimension columns of the delta row. If the SALESREPORT table already contains a row with those key values, then the aggregate values of the result row are combined with the aggregate values in the existing row. If the SALESREPORT table does not already contain a row with those key values, then the result row is inserted into the SALESREPORT table.

In the present example, the key values of result row 510 ("FEB 1980", "IRVINE") match row 514 in SALESREPORT table 502a. Therefore, row 510 is merged into the SALESREPORT table by adding the sumsales value of row 510 to the sumsales value of row 514 to produce row 516.

In contrast, the key values of result row 512 ("MAR 1980", "EUREKA") do not match any row in SALESREPORT table 502a. Consequently, result row 512 is inserted into the SALRESREPORT table to produce the refreshed SALESREPORT table 502C.

PARALLELISM

In the example illustrated above, the individual delta summary definitions that are used to create individual delta summaries are in the form of SQL statements that are derived from the summary definition. Significantly, the individual delta summary definition associated with one hypothetical table load may be generated and executed in any order relative the individual delta summary definitions associated with the other hypothetical table loads.

For example, the DELTA_SUM_DEF for the LOCATION table can be generated and executed to produce result row 512 before the DELTA_SUM_DEF for the PRODUCT_SALES table is generated and executed to produce result row 510. This holds true even though the hypothetical load of the PRODUCT_SALES table occurs before the hypothetical load of the LOCATION table.

Further, all of the individual delta summary queries can be generated and executed concurrently. With respect to the example given above, the DELTA_SUM_DEFs for each of the base tables can be generated and executed concurrently on a system that supports parallel processing and has sufficient processing resources available. Thus, the incremental refresh of a summary table can be performed using N-way parallelism, where N is the number of base tables from which the summary table is derived.

REDUCING THE NUMBER OF INDIVIDUAL DELTA SUMMARIES

The techniques described above may be used to correctly generate a set of individual delta summary expressions which collectively provide the information needed for incremental refresh. In the examples given above, and in the flow chart illustrated in FIG. 6, one individual delta summary expression is generated and executed for each base table. According to one embodiment of the invention, individual delta summary expressions are not generated or executed for a base table when it can be determined in advance that the individual delta summary for the base table will be empty.

For example, if a base table has no delta rows (i.e. no data has been added to the base table since the last summary table refresh), then execution of the individual delta summary query for that base table will not produce any result rows. Therefore, no individual delta summaries need to be generated or executed for base tables that have no delta rows.

In other circumstances, certain external facts may guarantee that the new rows that have been loaded into the given base table cannot possibly affect the contents of the summary table. For example, assume that a new store is built in Boston which results in a new row being added to the LOCATION table. However, the store has not yet opened for business so there are no records in the PRODUCT_SALES table for sales made in "Boston". Under these conditions, if the incremental refresh mechanism determines a priori that delta_LOCATION does not affect the contents of SALESREPORT, then LOCATION never becomes an interesting table.

Additionally, certain constraints or relationships between the base tables may guarantee that the new rows that have been loaded into the given base table cannot possibly affect the contents of the summary table. For example, if referential integrity constraints exist on the tables, this optimization is possible. For example, if there are foreign key constraints on the PRODUCT_SALES.time_id and PRODUCT_SALES.loc_id columns, then that guarantees that every row added to PRODUCT_SALES must correspond with an existing row in both TIME and location. In that case, it is not necessary to generate three delta summaries; a single delta summary based on delta_PRODUCT_SALES alone, is sufficient to perform incremental refresh of SALESREPORT. The other two delta summaries can produce no rows.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for performing incremental refresh of a summary table that has a plurality of base tables, the method comprising the steps of:

assigning a hypothetical load sequence to said plurality of base tables;

generating delta summary data by performing the following steps for at least one of the base tables:

performing a join between newly loaded data for said base table, a pre-load state of a first set of tables, and a post-load state of a second set of tables;

wherein said first set of tables are those tables of said plurality of base tables that are after said base table in said hypothetical load sequence wherein said second set of tables are those tables of said plurality of base tables that are before the base table in said hypothetical load sequence; and merging said delta summary data into said summary table.

2. The method of claim 1 further comprising the steps of:

determining whether a particular base table of said plurality of base tables has been updated subsequent to a most recent refresh of said summary table; and wherein said at least one of said base tables does not include said particular base table if said particular base table has not been updated subsequent to a most recent refresh of said summary table.

3. The method of claim 1 wherein updates were made to a particular base table of said plurality of base tables subsequent to a most recent refresh of said summary table, the method for comprising the steps of:

determining whether said updates can possibly affect the summary table; and wherein said at least one of said base tables does not include said particular base table if said updates cannot possibly affect the summary table.

4. The method of claim 3 wherein the step of determining whether said updates can possibly affect the summary table includes determining whether said updates can possibly affect the summary table based on constraints associated with said particular base table.

5. The method of claim 1 wherein:

said at least one of said plurality of base tables includes a first base table and a second base table; and the step of generating delta summary data includes concurrently performing:

a first join between newly loaded data for said first base table, the pre-load state of the base tables that are after said first base table in said hypothetical load sequence, and the post-load state of the base tables that are before said first base table in said hypothetical load sequence; and a second join between newly loaded data for said second base table, the pre-load state of the base tables that are after said second base table in said hypothetical load sequence, and the post- load state of the base tables that are before said second base table in said hypothetical load sequence.

6. The method of claim 1 wherein:

said at least one of said plurality of base tables includes all of said plurality of base tables; and the step of generating delta summary data includes generating, in parallel, individual delta summaries for each of said plurality of base tables.

7. A computer-readable medium carrying one or more sequences of instructions for performing incremental refresh of a summary table that has a plurality of base tables, wherein execution of the one or more sequences of instructions by one or more processors causes the one or more processors to perform the steps of:

assigning a hypothetical load sequence to said plurality of base tables;

generating delta summary data by performing the following steps for at least one of the base tables:

performing a join between newly loaded data for said base table, a pre-load state of a first set of tables, and post-load state of a second set of tables;

wherein said first set of tables are those tables of said plurality of base tables that are after said base table in said hypothetical load sequence;

wherein said second set of tables are those tables of said plurality of base tables that are before the base table in said hypothetical load sequence; and merging said delta summary data into said summary table.

8. The computer-readable medium of claim 7 further comprising instructions for performing the steps of:

determining whether a particular base table of said plurality of base tables has been updated subsequent to a most recent refresh of said summary table; and wherein said at least one of said base tables does not include said particular base table if said particular base table has not been updated subsequent to a most recent refresh of said summary table.

9. The computer-readable medium of claim 7 wherein updates were made to a particular base table of said plurality of base tables subsequent to a most recent refresh of said summary table, the sequences of instructions further comprising instructions for performing the steps of:

determining whether said updates can possibly affect the summary table; and wherein said at least one of said base tables does not include said particular base table if said updates cannot possibly affect the summary table.

10. The computer-readable medium of claim 9 wherein the step of determining whether said updates can possibly affect the summary table includes determining whether said updates can possibly affect the summary table based on constraints associated with said particular base table.

11. The computer-readable medium of claim 7 wherein:

said at least one of said plurality of base tables includes a first base table and a second base table; and the step of generating delta summary data includes concurrently performing:

a first join between newly loaded data for said first base table, the pre-load state of the base tables that are after said first base table in said hypothetical load sequence, and the post-load state of the base tables that are before said first base table in said hypothetical load sequence; and a second join between newly loaded data for said second base table, the pre-load state of the base tables that are after said second base table in said hypothetical load sequence, and the post- load state of the base tables that are before said second base table in said hypothetical load sequence.

12. The computer-readable medium of claim 7 wherein:

said at least one of said plurality of base tables includes all of said plurality of base tables; and the step of generating delta summary data includes generating, in parallel, individual delta summaries for each of said plurality of base tables.

13. A method for refreshing a summary table that is derived from a plurality of base tables, the method comprising the steps of:

loading new data into one or more base tables of said plurality of base tables between a first point in time and a second point in time, wherein summary values in said summary table initially reflect the state of said plurality of base tables at said first point in time;

assigning a sequence to said plurality of base tables;

for at least one of said plurality of base tables, performing the steps of generating an individual delta summary based on (a) new data loaded into said base table between said first point in time and said second point in time;

(b) data that existed in a first set of said plurality of base tables at said first point in time, said first set including all tables of said plurality of base tables that are after said base table in said sequence; and (c) data that existed in a second set of said plurality of base tables at said second point in time, said second set including all tables of said plurality of base tables that are before said base table in said sequence; and merging said individual delta summary into said summary table.

14. The method of claim 13 wherein the step of generating said individual delta summary includes the step of transforming a summary table definition associated with said summary table to produce a query that generates said individual delta summary.

15. The method of claim 13 further comprising the step of selecting said sequence without reference to any sequence of any loads into said plurality of base tables.

16. A system comprising:

one or more memory devices that have stored therein a plurality of base tables;

a summary table that is derived from said plurality of base tables;

sequences of instructions for incrementally updating said summary table after new data has been loaded into one or more of said plurality of base tables;

one or more processors operatively coupled to said one or more memory devices, the one or more processors configured to perform the following steps in response to executing said sequences of instructions:

assigning a hypothetical load sequence to said plurality of base tables;

generating delta summary data by performing the following steps for at least one of the base tables performing a join between newly loaded data for said base table, a pre-load state of a first set of tables, and a post-load state of a second set of tables;

wherein said first set of tables are those tables of said plurality of base tables that are after said base table in said hypothetical load sequence;

wherein said second set of tables are those tables of said plurality of base tables that are before the base table in said hypothetical load sequence; and merging said delta summary data into said summary table.

17. The system of claim 16 wherein updates were made to a particular base table of said plurality of base tables subsequent to a most recent refresh of said summary table, the one or more processors being configured to perform the further steps of:

determining whether said updates can possibly affect the summary table; and wherein said at least one of said base tables does not include said particular base table if said updates cannot possibly affect the summary table.

18. The system of claim 16 wherein individual delta summaries are generated in parallel for two or more of said base tables.

* * * * *